(12) United States Patent
Xu

(10) Patent No.: US 11,386,710 B2
(45) Date of Patent: Jul. 12, 2022

(54) EYE STATE DETECTION METHOD, ELECTRONIC DEVICE, DETECTING APPARATUS AND COMPUTER READABLE STORAGE MEDIUM

(71) Applicant: BOE TECHNOLOGY GROUP CO., LTD., Beijing (CN)

(72) Inventor: Chu Xu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 446 days.

(21) Appl. No.: 16/473,491

(22) PCT Filed: Nov. 30, 2018

(86) PCT No.: PCT/CN2018/118374
§ 371 (c)(1),
(2) Date: Jun. 25, 2019

(87) PCT Pub. No.: WO2019/205633
PCT Pub. Date: Oct. 31, 2019

(65) Prior Publication Data
US 2021/0357617 A1    Nov. 18, 2021

(30) Foreign Application Priority Data
Apr. 27, 2018    (CN) .......................... 201810394919.1

(51) Int. Cl.
*G06V 40/18*    (2022.01)
*G06T 7/73*    (2017.01)
(Continued)

(52) U.S. Cl.
CPC ......... *G06V 40/193* (2022.01); *G06K 9/6256* (2013.01); *G06K 9/6262* (2013.01);
(Continued)

(58) Field of Classification Search
CPC ............ G06K 9/0061; G06K 9/00617; G06K 9/6256; G06K 9/6262; G06K 9/6298;
(Continued)

(56) References Cited

U.S. PATENT DOCUMENTS

2008/0181508 A1* 7/2008 Kaneda ............. G06K 9/00308
382/190
2008/0317385 A1* 12/2008 Nakada ................. A63F 13/213
382/305
(Continued)

FOREIGN PATENT DOCUMENTS

| CN | 101030316 A | 9/2007 |
|---|---|---|
| CN | 106228293 A | 12/2016 |
| CN | 106485191 A | 3/2017 |
| CN | 107704805 A | 2/2018 |
| CN | 108615014 A | 10/2018 |

OTHER PUBLICATIONS

International Search Report and Written Opinion dated Mar. 1, 2019 from State Intellectual Property Office of the P.R. China.

*Primary Examiner* — Jerome Grant, II
(74) *Attorney, Agent, or Firm* — Dilworth & Barrese, LLP.; Michael J. Musella, Esq.

(57) ABSTRACT

The present invention is directed to positioning a plurality of eye feature points in the target image to determine position coordinates of the plurality of eye feature points normalizing the position coordinates of the plurality of eye feature points to obtain normalized position feature data and determining an eye state in the target image based on the position feature data.

20 Claims, 5 Drawing Sheets

(51) Int. Cl.
   *G06T 7/77* (2017.01)
   *G06K 9/62* (2022.01)
   *G06V 40/16* (2022.01)
(52) U.S. Cl.
   CPC .............. *G06K 9/6298* (2013.01); *G06T 7/73* (2017.01); *G06T 7/77* (2017.01); *G06V 40/197* (2022.01); *G06T 2207/30201* (2013.01); *G06V 40/171* (2022.01)
(58) Field of Classification Search
   CPC ......... G06K 9/00281; G06T 7/73; G06T 7/77; G06T 2207/30201
   USPC .......................................................... 382/103
   See application file for complete search history.

(56) References Cited

U.S. PATENT DOCUMENTS

| | | | |
|---|---|---|---|
| 2010/0160049 | A1* | 6/2010 | Oku ....................... A63F 13/655 463/43 |
| 2012/0154550 | A1* | 6/2012 | Takagi ..................... G06K 9/00 348/49 |
| 2013/0093847 | A1* | 4/2013 | Yahagi ................. H04N 13/221 348/43 |
| 2017/0140210 | A1* | 5/2017 | Sun ........................... G06T 7/68 |
| 2020/0401879 | A1* | 12/2020 | Menard ................ G06F 16/953 |
| 2021/0209851 | A1* | 7/2021 | Xu ........................ G06K 9/4623 |
| 2021/0271865 | A1* | 9/2021 | Osawa ............... G06K 9/00281 |

* cited by examiner

EYE STATE DETECTION METHOD, ELECTRONIC DEVICE, DETECTING APPARATUS AND COMPUTER READABLE STORAGE MEDIUM

The present disclosure is based on PCT/CN2018/118374, filed on Nov. 30, 2018, which claims the priority of the Chinese Patent Application No. 201810394919.1 filed on Apr. 27, 2018, the entire disclosure of which is hereby incorporated by reference.

TECHNICAL FIELD

Embodiments of the present disclosure relate to an eye state detection method, an electronic device, a detecting apparatus, and a computer readable storage medium.

BACKGROUND

Eyes are the most important features of a human face, and play an extremely important role in computer vision researches and applications. The eye state detection has always been the focus of researchers. On the basis of face recognition, the detection of an eye state may help various smart devices to recognize the state of human eyes, and has broad application prospects in the field of fatigue detection and visual interaction, for example, driver's fatigue detection and invalid photos filtering.

SUMMARY

According to at least one embodiment of the present disclosure, there is provided an eye state detection method, including: acquiring a target image; positioning a plurality of eye feature points in the target image to determine position coordinates of the plurality of eye feature points; normalizing the position coordinates of the plurality of eye feature points to obtain normalized position feature data; and determining an eye state in the target image based on the position feature data.

For example, the eye feature points include left eye feature points and right eye feature points. Normalizing the position coordinates of the plurality of eye feature points to obtain normalized position feature data includes: determining an Euclidean distance between a mean value of position coordinates of left eye feature points and a mean value of position coordinates of right eye feature points; and normalizing the position coordinates of the plurality of eye feature points by the Euclidean distance as a standard unit, to obtain normalized position feature data.

For example, determining an eye state in the target image based on the position feature data includes: classifying the position feature data; and determining an eye state in the target image based on the classification result.

For example, determining an Euclidean distance between a mean value of position coordinates of left eye feature points and a mean value of position coordinates of right eye feature points includes: determining a mean value of position coordinates $$El\left(\frac{\sum_{i=1}^{0.5N} X_i}{0.5N}, \frac{\sum_{i=1}^{0.5N} Y_i}{0.5N}\right)$$

of left eye feature points and a mean value of position coordinates $$Er\left(\frac{\sum_{i=0.5N+1}^{N} X_i}{0.5N}, \frac{\sum_{i=0.5N+1}^{N} Y_i}{0.5N}\right)$$

of right eye feature points, where $X_i$ is the horizontal axis coordinate of the i-th eye feature point, $Y_i$ is the vertical axis coordinate of the i-th eye feature point; the value of i ranges from 1 to N, the first to the (0.5N)th eye feature points are left eye feature points, the (0.5N+1)th to the N-th eye feature points are right eye feature points, and N is an even number; and determining the Euclidean distance Ed between El and Er based on El and Er.

For example, normalizing the position coordinates of the plurality of eye feature points by the Euclidean distance as a standard unit, to obtain normalized position feature data includes: normalizing the position coordinates of the plurality of eye feature points according to the formulas $$X_{inew} = \frac{X_i - \frac{\sum_{i=1}^{N} X_i}{N}}{Ed} \text{ and } Y_{inew} = \frac{Y_i - \frac{\sum_{i=1}^{N} Y_i}{N}}{Ed},$$

to obtain new position coordinates of the plurality of eye feature points, as the normalized position feature data, where $X_{inew}$ is the new coordinate of the horizontal axis of the i-th eye feature point, and $Y_{inew}$ is the new coordinate of the vertical axis of the i-th eye feature point.

For example, N=12.

For example, classifying the position feature data includes: classifying the position feature data with a classifier.

For example, classifying the position feature data further includes: training the classifier with sample images to obtain a classifier parameter for the eye state detection.

For example, training the classifier with sample images to obtain a classifier parameter for the eye state detection including: acquiring positive and negative sample images from a picture library, wherein the eye state in the positive sample images is an opened eye state, and the eye state in the negative sample images is a closed eye state; positioning the eye feature points in the positive and negative sample images, to obtain position coordinates of the plurality of eye feature points in the positive and negative sample images; normalizing the position coordinates of the plurality of eye feature points, to obtain normalized position feature data; and training the classifier with the position feature data to obtain a classifier parameter for detecting the eye state.

For example, positioning a plurality of eye feature points in the target image includes: detecting whether a human face is included in the target image; and when detecting that the target image includes a human face, positioning the plurality of eye feature points in the target image.

According to at least one embodiment of the present disclosure, there is provided an electronic device including at least one processor, at least one memory, and computer program instructions stored in the memory, when the computer program instructions are executed by the processor, the processor is caused to perform: acquiring a target image; positioning a plurality of eye feature points in the target image to determine position coordinates of the plurality of eye feature points; normalizing the position coordinates of the plurality of eye feature points to obtain normalized position feature data; and determining an eye state in the target image based on the position feature data.

For example, the eye feature points include left eye feature points and right eye feature points; and normalizing the position coordinates of the plurality of eye feature points to obtain normalized position feature data includes: determining an Euclidean distance between a mean value of position coordinates of left eye feature points and a mean value of position coordinates of right eye feature points; and normalizing the position coordinates of the plurality of eye feature points by the Euclidean distance as a standard unit, to obtain normalized position feature data.

For example, determining an eye state in the target image based on the position feature data includes: classifying the position feature data; and determining an eye state in the target image based on the classification result.

For example, determining a Euclidean distance between a mean value of position coordinates of left eye feature points and a mean value of position coordinates of right eye feature points includes: determining a mean value of position coordinates $$El\left(\frac{\sum_{i=1}^{0.5N} X_i}{0.5N}, \frac{\sum_{i=1}^{0.5N} Y_i}{0.5N}\right)$$

of left eye feature points and a mean value of position coordinates $$Er\left(\frac{\sum_{i=0.5N+1}^{N} X_i}{0.5N}, \frac{\sum_{i=0.5N+1}^{N} Y_i}{0.5N}\right)$$

of right eye feature points, where, $X_i$ is the horizontal axis coordinate of the i-th eye feature point, $Y_i$ is the vertical axis coordinate of the i-th eye feature point; the value of i ranges from 1 to N, the first to the (0.5N)th eye feature points are left eye feature points, the (0.5N+1)th to the N-th eye feature points are right eye feature points, and N is an even number; and determining the Euclidean distance Ed between El and Er based on El and Er.

For example, normalizing the position coordinates of the plurality of eye feature points by the Euclidean distance as a standard unit, to obtain normalized position feature data includes: normalizing the position coordinates of the plurality of eye feature points according to the formulas $$X_{inew} = \frac{X_i - \frac{\sum_{i=1}^{N} X_i}{N}}{Ed} \text{ and } Y_{inew} = \frac{Y_i - \frac{\sum_{i=1}^{N} Y_i}{N}}{Ed},$$

to obtain new position coordinates of the plurality of eye feature points, as the normalized position feature data, where $X_{inew}$ is the new coordinate of the horizontal axis of the i-th eye feature point, and $Y_{inew}$ is the new coordinate of the vertical axis of the i-th eye feature point.

For example, classifying the position feature data includes: classifying the position feature data with a classifier.

For example, classifying the position feature data further includes: training the classifier with sample images to obtain a classifier parameter for the eye state detection.

For example, training the classifier with sample images to obtain a classifier parameter for eye state detection including: acquiring positive and negative sample images from a picture library, wherein the eye state in the positive sample images is an opened eye state, and the eye state in the negative sample images is a closed eye state; positioning the eye feature points in the positive and negative sample images, to obtain position coordinates of the plurality of eye feature points in the positive and negative sample images; normalizing the position coordinates of the plurality of eye feature points, to obtain normalized position feature data; and training the classifier with the position feature data to obtain a classifier parameter for detecting the eye state.

According to at least one embodiment of the present disclosure, there is provided an eye state detection apparatus, including: an acquiring sub-circuit configured to acquire a target image; a positioning sub-circuit configured to position a plurality of eye feature points in the target image to determine position coordinates of the plurality of eye feature points; a normalization processing sub-circuit configured to normalize the position coordinates of the plurality of eye feature points to obtain the normalized position feature data; and a determining sub-circuit configured to determine an eye state in the target image based on the position feature data.

According to at least one embodiment of the present disclosure, there is provided a computer readable storage medium having stored thereon computer program instructions, when the computer program instructions are executed by a processor, the processor performs the method of the above embodiments.

BRIEF DESCRIPTION OF THE DRAWINGS

Other features, objects, and advantages of the present disclosure will become more apparent from detailed description of non-limiting embodiments with reference to the following accompanying drawings.

DETAILED DESCRIPTION

Figure 1:
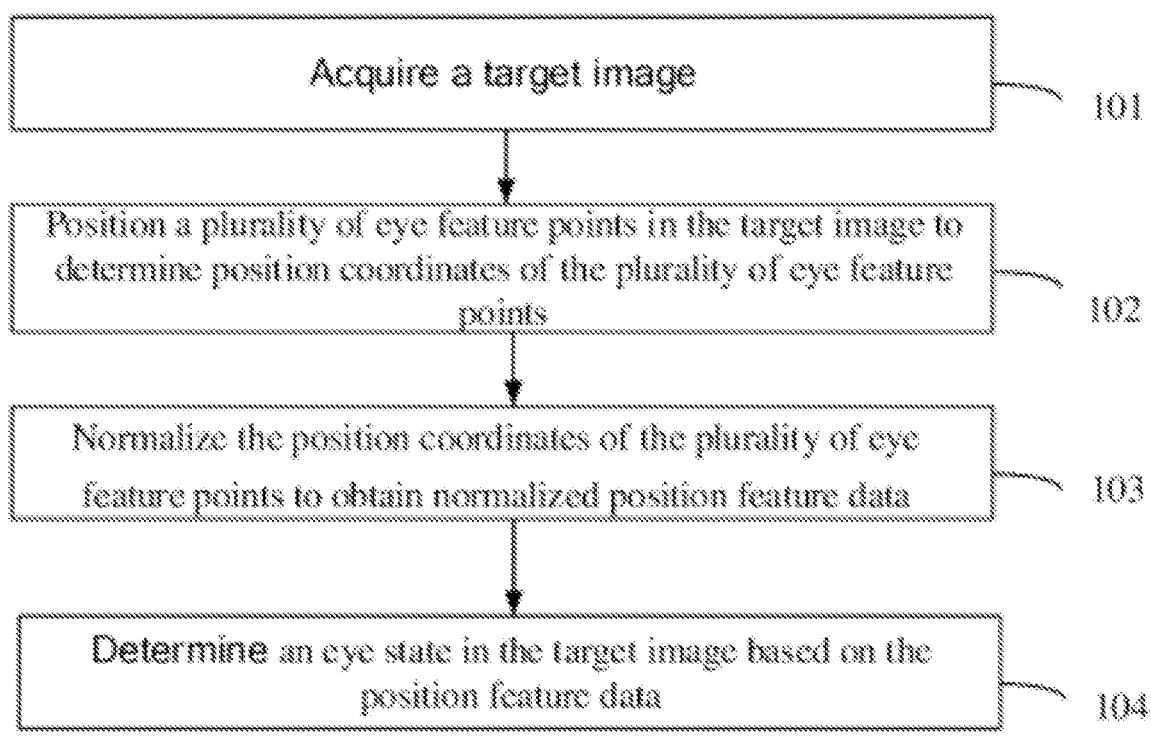
FIG. 1 is a schematic flowchart diagram of an eye state detection method according to an embodiment of the present disclosure.

The present disclosure will be described in detail in one example with reference to the accompanying drawings and embodiments. It should be understood that the specific embodiments described herein are merely illustrative of the present disclosure, rather than limitation of the present disclosure. It should also be noted that, for the convenience of description, only parts related to the present disclosure are shown in the drawings.

It should be noted that the embodiments in the present disclosure and the features in the embodiments may be combined with each other without conflict.

The present disclosure will be described in detail below with reference to the drawings and embodiments.

Embodiments of the present disclosure provide an eye state detection method. An eye state may include an opened eye state and a closed eye state. Of course, the eye state may also include a semi-opened and semi-closed state, a fatigue state, a squint state, and so on. The present disclosure describes the eye state detection only by taking the opened eye state and the closed eye state as an example.

As shown in FIG. 1, a schematic flowchart of an eye state detection method according to an embodiment of the present disclosure includes the following steps 101-104. The order of the above steps as described is only an example of the embodiments of the present disclosure, and is not the only order, and other possible execution order is also conceivable by those skilled in the art according to the present disclosure.

In Step 101, a target image is acquired.

The target image may be acquired by a camera or may be received from other devices other than the camera.

In Step 102, a plurality of eye feature points in the target image are positioned to determine position coordinates of the plurality of eye feature points.

In the embodiment of the present disclosure, before determining the position coordinates of the plurality of eye feature points in the target image, it may be first detected whether the target image includes a face, for example, with a face detection technique. The face detection technique refers to a method of searching for a given image using a certain strategy to determine whether a face is contained. For example, a linear subspace method, a neural network method, or the like may be used to detect whether a face is included in a target image.

When it is detected that the target image includes a human face, the face region in the target image can be determined, and then the plurality of eye feature points in the face region can be positioned, and thereby the position coordinates of the plurality of eye feature points can be determined. For example, eye feature points can be positioned by an eye feature learning machine. For example, first, positive and negative samples of a plurality of eye feature points are acquired. For example, an image recognition algorithm can be used to detect a plurality of images that may include eye features, to obtain a positive sample and a sub-sample of a plurality of eye feature points. A positive sample is a sample that includes eye features, and a sub-sample is a sample that is similar to an eye feature but is not an eye feature. Second, the eye feature learning machine is trained with a large number of positive and negative samples. Next, the face region in the target image or the target image is input into the trained learning machine, and the trained learning machine can automatically position the eye feature points in the input face region and determine position coordinates of the positioned positions in the target image.

In the embodiment, the eye feature points include left eye feature points and right eye feature points, which may be, but not limited to, edge points of the eye corners and upper and lower eyelids. The number of feature points of the left and right eyes can be set as needed, and based on the symmetrical characteristics of the human eyes in the face. The numbers of feature points of the left and right eyes can be the same. In the embodiment of the present disclosure, the algorithm used for positioning the left and right eye feature points determines the number of left and right eye feature points as 12, that is, 6 left eye feature points and 6 right eye feature points respectively, for example, a left eye corner point, a right eye corner point, two edge points of upper eyelids and two edge points of lower eyelids. Of course, those skilled in the art understand that the number of left and right eye feature points may vary depending on the detection accuracy. However, a large number can increase the calculation cost, and a small number may suffer from low positioning accuracy. Therefore, 12 feature points are selected in this example to balance the accuracy and the calculation amount.

In addition, the position coordinates of the eye feature points can be, but not limited to, positioned in a XY axis coordinate system. The coordinate system can take the upper left corner of the target image as the origin, the horizontal direction as the horizontal axis, that is, the X axis, and the vertical direction as the vertical axis, that is, the Y axis.

In Step 103, the position coordinates of the plurality of eye feature points are normalized to obtain normalized position feature data. For example, an Euclidean distance between a mean value of position coordinates of the left eye feature points and a mean value of position coordinates of the right eye feature points is used as a standard unit for normalizing the position coordinates of the plurality of eye feature points.

Taking N as 12 as an example, the horizontal axis coordinates of 12 eye feature points are X (X1, X2, . . . , X11, X12), and the vertical axis coordinates of 12 eye feature points are Y (Y1, Y2, . . . , Y11, Y12).

When the step 103 is performed, a mean value of position coordinates Ea $$\left( \frac{\sum_{i=1}^{N} X_i}{N}, \frac{\sum_{i=1}^{N} Y_i}{N} \right)$$

of all the eye feature points, a mean value of position coordinates $$El\left( \frac{\sum_{i=1}^{0.5N} X_i}{0.5N}, \frac{\sum_{i=1}^{0.5N} Y_i}{0.5N} \right)$$

of left eye feature points and a mean value of position coordinates $$Er\left( \frac{\sum_{i=0.5N+1}^{N} X_i}{0.5N}, \frac{\sum_{i=0.5N+1}^{N} Y_i}{0.5N} \right)$$

of right eye feature points can be firstly determined.

Where $X_i$ is the horizontal axis coordinate of the i-th eye feature point, $Y_i$ is the vertical axis coordinate of the i-th eye feature point; the value of i ranges from 1 to N, the first to the (0.5N)th eye feature points are left eye feature points, the (0.5N+1)th to the N-th eye feature points are right eye feature points, and N is an even number. Then the Euclidean distance Ed between El and Er is calculated. The Euclidean distance can be calculated, for example, through the following formula:

$$\rho = \sqrt{(x_2-x_1)^2+(y_2-y_1)^2}$$

where $\rho$ is the Euclidean distance between points $(x_2,y_2)$ and $(x_1,y_1)$. Then the Euclidean distance between El and Er is:

$$Ed = \sqrt{\left(\left(\frac{\sum_{i=0.5N+1}^{N} X_i}{0.5N} - \frac{\sum_{i=1}^{0.5N} X_i}{0.5N}\right)^2 + \left(\frac{\sum_{i=0.5N+1}^{N} Y_i}{0.5N} - \frac{\sum_{i=1}^{0.5N} Y_i}{0.5N}\right)^2\right)}$$

Finally, according to the formulas $$X_{inew} = \frac{X_i - \frac{\sum_{i=1}^{N} X_i}{N}}{Ed} \text{ and } Y_{inew} = \frac{Y_i - \frac{\sum_{i=1}^{N} Y_i}{N}}{Ed},$$

the position coordinates of the plurality of eye feature points are normalized to obtain new position coordinates of the plurality of eye feature points; where $X_{inew}$ is the new coordinate of the horizontal axis of the i-th eye feature point, and $Y_{inew}$ is the new coordinate of the vertical axis of the i-th eye feature point.

The obtained new position coordinates of the eye feature points are the position feature data obtained after the normalization process.

In Step 104, an eye state in the target image is determined based on the position feature data. For example, the position feature data can be classified to determine the state eye in the target image.

The obtained position feature data can be classified with a classifier.

]For example, the embodiment of the present disclosure can further include: training a classifier with sample images to obtain a classifier parameter for detecting the eye state.

Figure 2:
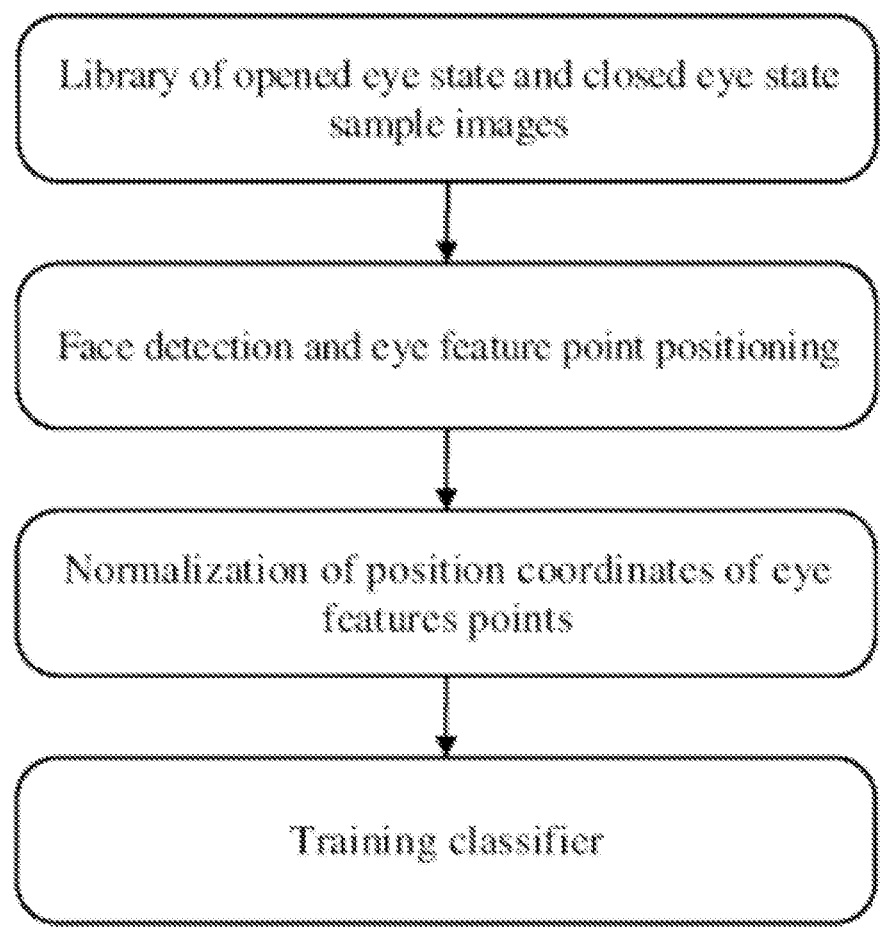
FIG. 2 is a schematic diagram of a training process of a classifier according to an embodiment of the present disclosure.

In the embodiment of the present disclosure, the training process of the classifier can be as shown in FIG. 2.

The order of the steps in FIG. 2 as described is merely an example of the embodiments of the present disclosure, and is not the only order, and other possible execution order is also conceivable by those skilled in the art based on the present disclosure.

First, the positive and negative sample images are acquired from a library of sample images of opened eye states and closed eye states. The eye state in the positive sample image is the opened eye state, and the eye state in the negative sample image is the closed eye state.

Then, face detection and eye feature point positioning are performed on the positive and negative sample images to determine position coordinates of the plurality of eye feature points in the positive and negative sample images.

Next, based on the normalization processing principle in the above Step 103, the position coordinates of the plurality of eye feature points are normalized to obtain the normalized position feature data.

Finally, with the obtained position feature data, the classifier is trained to obtain a classifier parameter for detecting the eye state. The classifier can classify the opened eye state or the closed eye state. For example, if the position coordinates of the eye feature points are input into the classifier, the classifier can determine whether the feature at the position coordinates corresponds to an opened eye state or a closed eye state.

The present disclosure is further described below in conjunction with specific embodiments, but the present disclosure is not limited to the following embodiments.

Figure 3:
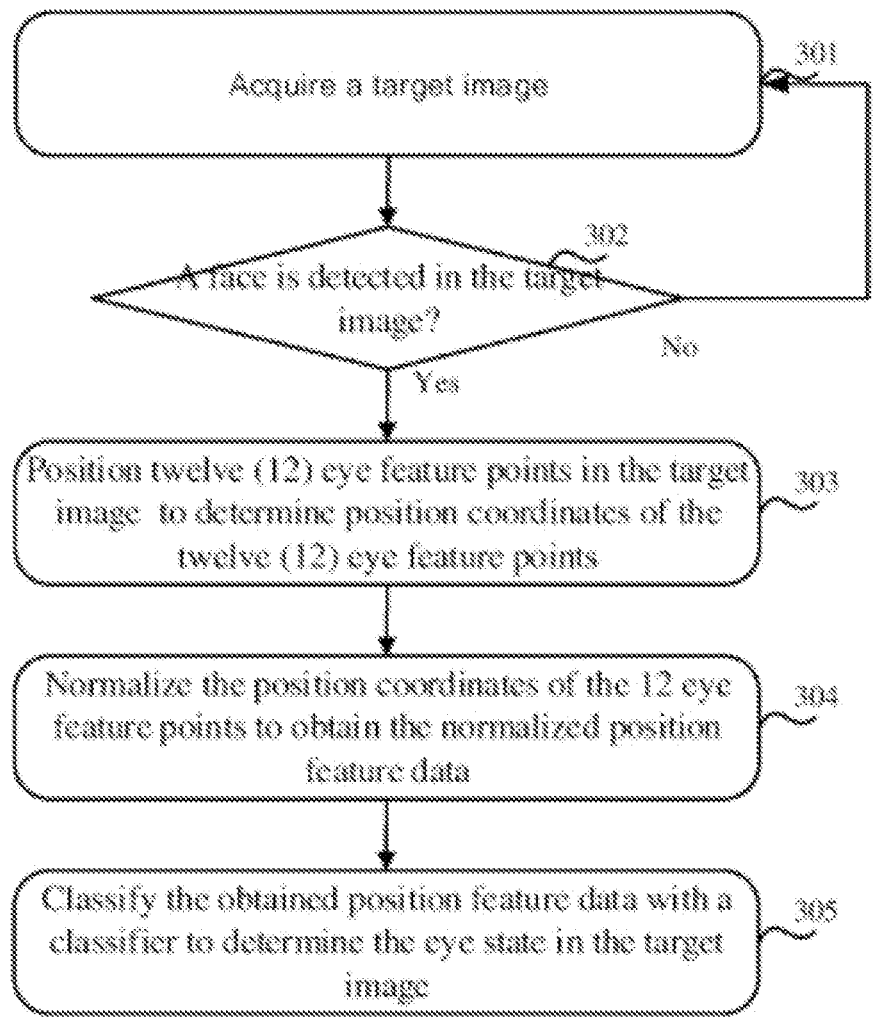
FIG. 3 is a detailed flowchart of an eye state detection method according to an embodiment of the present disclosure.

FIG. 3 is a schematic flowchart diagram of an eye state detection method according to an embodiment of the present disclosure. The method for detecting the eye may include the following steps 301-305. The order of the above steps as described is only an example of the embodiments of the present disclosure, and is not the only order. Other possible execution order is also conceivable by those skilled in the art according to the present disclosure.

In Step 301, a target image is acquired.

In Step 302, it is detected whether a face is included in the target image.

When it is detected that the target image includes a human face, Step 303 is performed. When it is detected that the target image does not include a human face, the process ends, and the process returns to Step 301.

In Step 303, twelve (12) eye feature points in the target image are positioned to determine position coordinates of the twelve (12) eye feature points.

The horizontal axis coordinates the 12 eye feature points are X (X1, X2, . . . , X11, X12) of, and the vertical axis coordinates of the 12 eye feature points are Y (Y1, Y2, . . . , Y11, Y12).

In Step 304, the position coordinates of the 12 eye feature points are normalized by an Euclidean distance between a mean value of position coordinates of left eye feature points and a mean value of position coordinates of right eye feature points, to obtain the normalized position feature data.

First, a mean value of position coordinates $$Ed\left(\frac{\sum_{i=1}^{12} X_i}{12}, \frac{\sum_{i=1}^{12} Y_i}{12}\right)$$

of all the eye feature points, a mean value of position coordinates $$El\left(\frac{\sum_{i=1}^{6} X_i}{6}, \frac{\sum_{i=1}^{6} Y_i}{6}\right)$$

of left eye feature points and a mean value of position coordinates $$Er\left(\frac{\sum_{i=7}^{12} X_i}{6}, \frac{\sum_{i=7}^{12} Y_i}{6}\right)$$

of right eye feature points are determined.

Where $X_i$ is the horizontal axis coordinate of the i-th eye feature point, and $Y_i$ is the vertical axis coordinate of the i-th eye feature point.

Then, the Euclidean distance Ed of El and Er is calculated.

Finally, according to the formulas $$X_{inew} = \frac{X_i - \frac{\sum_{i=1}^{12} X_i}{12}}{Ed} \text{ and } Y_{inew} = \frac{Y_i - \frac{\sum_{i=1}^{12} Y_i}{12}}{Ed},$$

the position coordinates of the twelve (12) eye feature points are normalized to obtain the new position coordinates of the 12 eye feature points, where $X_{inew}$ is the new coordinate of the horizontal axis of the i-th eye feature point, and $Y_{inew}$ is the new coordinate of the vertical axis of the i-th eye feature point.

Taking (X1, Y1) as an example:

$$X1_{new} = \frac{X1 - \frac{\sum_{i=1}^{12} X_i}{12}}{Ed}, \text{ and } Y1_{new} = \frac{Y1 - \frac{\sum_{i=1}^{12} Y_i}{12}}{Ed}.$$

Calculation are performed similarly for the other eye feature points, to obtain the new position coordinates of the twelve (12) eye feature points are: ($X1_{new}$, $X2_{new}$ . . . $X11_{new}$, $X12_{new}$, $Y1_{new}$, $Y2_{new}$ . . . $Y11_{new}$, $Y12_{new}$), that is, the position feature data obtained after the normalization process.

In Step 305, the obtained position feature data is classified by a classifier to determine the eye state in the target image.

In the eye state detection method provided by the embodiment of the present disclosure, the eye state is determined by acquiring a target image, determining position coordinates of the plurality of eye feature points in the target image, and normalizing the position coordinates of the plurality of eye feature points by an Euclidean distance between a mean value of position coordinates of the left eye feature points and a mean value of position coordinates of the right eye feature points as a standard unit to obtain normalized position feature data; and classifying the position feature data to determine the eye state in the target image. The present method can accurately detect the eye state in the target image, and due to the normalization process, it won't be affected by the size and position of the eye region in the target image and has an excellent robustness.

It should be noted that although the operations of the disclosed methods are described in a particular order in the figures, this is not a requirement or implied that the operations must be performed in that particular order, or that all of the operations shown must be performed to achieve the desired results. Instead, the steps depicted in the flowcharts can change the order of execution. Additionally or alternatively, certain steps can be omitted, multiple steps can be combined into one step, and/or one step can be broken down into multiple steps.

Figure 4:
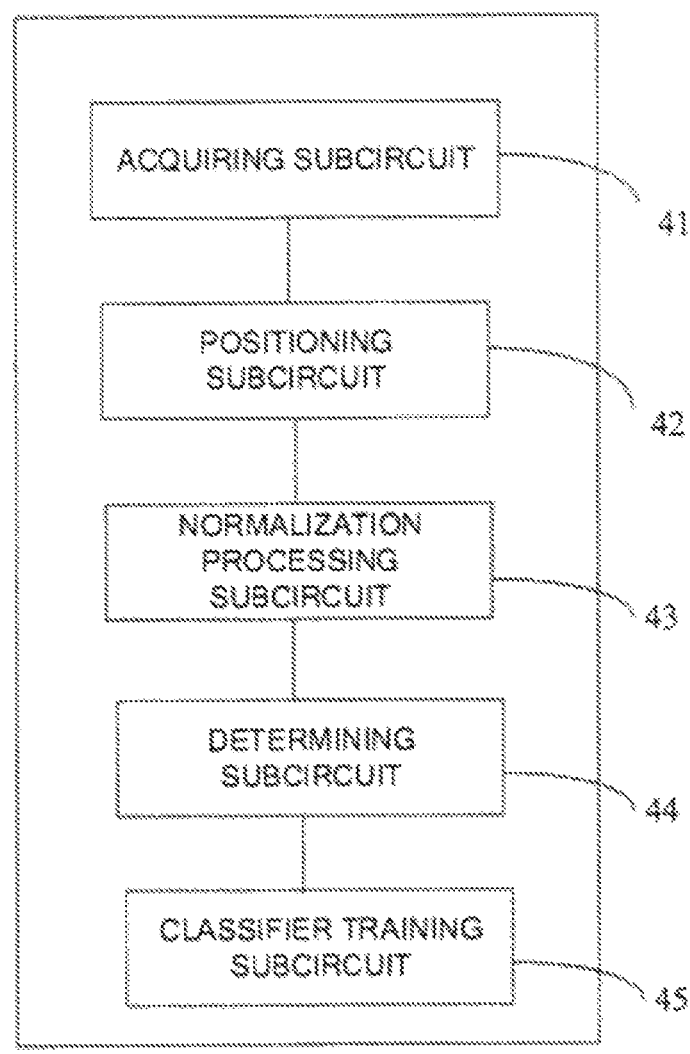
FIG. 4 is a block diagram of an eye state detection apparatus according to an embodiment of the present disclosure.

Based on the same inventive concept as the foregoing method, the embodiment of the present disclosure further provides an eye state detection apparatus. For the sake of brevity of the description, the following is only a brief description. FIG. 4 is a structural block diagram of an eye state detection apparatus according to an embodiment of the present disclosure, the apparatus includes: an acquiring sub-circuit 41, a positioning sub-circuit 42, a normalization processing sub-circuit 43 and a determining sub-circuit 44.

The acquiring sub-circuit 41 is configured to acquire a target image, wherein the acquiring sub-circuit is, for example, a camera, a video camera, or the like, and can be a program command that calls for a target image.

The positioning sub-circuit 42 is configured to position a plurality of eye feature points in the target image to determine position coordinates of the plurality of eye feature points, wherein, for example, eye feature points can include left eye feature points and right eye feature points.

The normalization processing sub-circuit 43 is configured to normalize the position coordinates of the plurality of eye feature points to obtain the normalized position feature data, wherein, for example, the position coordinates of the plurality of eye feature points can be normalized by an Euclidean distance between a mean value of position coordinates of left eye feature points and a mean value of position coordinates of right eye feature points, to obtain normalized position feature data, as a standard unit for normalizing the position coordinates of the plurality of eye feature points.

The determining sub-circuit 44 is configured to determine an eye state in the target image based on the position feature data.

For example, the positioning sub-circuit 42, the normalization processing sub-circuit 43, and the determining sub-circuit 44 can be implemented by software, or can be implemented by hardware or firmware. For example, they can be implemented by a general purpose processor, programmable logic circuits, or integrated circuits.

For example, the positioning sub-circuit 42 is configured, for example, to detect whether a face is included in the target image, and when detecting that the target image includes a human face, position a plurality of eye feature points in the target image.

For example, the normalization processing sub-circuit 43 is configured to: determine a mean value of position coordinates $$El\left(\frac{\sum_{i=1}^{0.5N} X_i}{0.5N}, \frac{\sum_{i=1}^{0.5N} Y_i}{0.5N}\right)$$

of left eye feature points and a mean value of position coordinates $$Er\left(\frac{\sum_{i=0.5N+1}^{N} X_i}{0.5N}, \frac{\sum_{i=0.5N+1}^{N} Y_i}{0.5N}\right)$$

of right eye feature points, where $X_i$ is the horizontal axis coordinate of the i-th eye feature point, $Y_i$ is the vertical axis coordinate of the i-th eye feature point; the value of i ranges from 1 to N, the first to the (0.5N)th eye feature points are left eye feature points, the (0.5N+1)th to the N-th eye feature points are right eye feature points, and N is an even number; calculate the Euclidean distance Ed between El and Er; and normalizing the position coordinates of the plurality of eye feature points according to the formulas $$X_{inew} = \frac{X_i - \frac{\sum_{i=1}^{N} X_i}{N}}{Ed} \text{ and } Y_{inew} = \frac{Y_i - \frac{\sum_{i=1}^{N} Y_i}{N}}{Ed},$$

to obtain new position coordinates of the plurality of eye feature points, as the normalized position feature data; where $X_{inew}$ is the new coordinate of the horizontal axis of the i-th eye feature point, and $Y_{inew}$ is the new coordinate of the vertical axis of the i-th eye feature point.

For example, in the embodiment, N=12.

For example, the determining sub-circuit 44 is configured to classify the position feature data with a classifier.

In one example, the apparatus further includes: a classifier training sub-circuit 45 configured to train the classifier with sample images to obtain a classifier parameter for eye state detection.

It should be understood that the subsystems or sub-circuit described in relation to the above-described apparatus for detecting the opened-eye or closed-eye state correspond to the respective steps in the method described with reference to FIGS. 1-3. Thus, the operations and features described above for the method are also applicable to the eye state detection apparatus and the sub-circuit included therein, details of which will not be repeated herein.

Based on the same inventive concept, embodiments of the present disclosure also provide a computer device suitable for implementing the embodiments of the present disclosure and implementing the method of the foregoing embodiments.

For example, the computer device includes a memory and a processor, the memory storing computer program instructions, and when the processor processes the program instructions, the processor performs: acquiring a target image; and positioning a plurality of eye feature points in the target image to determine position coordinates of the plurality of eye feature points; normalizing the position coordinates of the plurality of eye feature points to obtain normalized position feature data; and determining an eye state in the target image based on the position feature data.

For example, the eye feature points include left eye feature points and right eye feature points. Normalizing the position coordinates of the plurality of eye feature points, to obtain the normalized position feature data includes: determining an Euclidean distance between a mean value of position coordinates of left eye feature points and a mean value of position coordinates of right eye feature points; normalizing the position coordinates of the plurality of eye feature points by the Euclidean distance as a standard unit, to obtain normalized position feature data.

For example, determining the eye state in the target image based on the position feature data includes: classifying the position feature data; and determining an eye state in the target image based on the classification result.

For example, determining an Euclidean distance between a mean value of position coordinates of left eye feature points and a mean value of position coordinates of right eye feature points includes: determining a mean value of position coordinates of left eye feature points and a mean value of position $$El\left(\frac{\sum_{i=1}^{0.5N} X_i}{0.5N}, \frac{\sum_{i=1}^{0.5N} Y_i}{0.5N}\right)$$

coordinates $$Er\left(\frac{\sum_{i=0.5N+1}^{N} X_i}{0.5N}, \frac{\sum_{i=0.5N+1}^{N} Y_i}{0.5N}\right)$$

of right eye feature points, where $X_i$ is the horizontal axis coordinate of the i-th eye feature point, $Y_i$ is the vertical axis coordinate of the i-th eye feature point; the value of i ranges from 1 to N, the first to the (0.5N)th eye feature points are left eye feature points, the (0.5N+1)th to the N-th eye feature points are right eye feature points, and N is an even number; and determining the Euclidean distance Ed between El and Er based on El and Er.

For example, normalizing the position coordinates of the plurality of eye feature points by the Euclidean distance as a standard unit, to obtain normalized position feature data includes: normalizing the position coordinates of the plurality of eye feature points according to the formulas $$X_{inew} = \frac{X_i - \frac{\sum_{i=1}^{N} X_i}{N}}{Ed} \text{ and } Y_{inew} = \frac{Y_i - \frac{\sum_{i=1}^{N} Y_i}{N}}{Ed},$$

to obtain new position coordinates of the plurality of eye feature points, as the normalized position feature data; where $X_{inew}$ is the new coordinate of the horizontal axis of the i-th eye feature point, and $Y_{inew}$ is the new coordinate of the vertical axis of the i-th eye feature point.

For example, N=12.

For example, classifying the position feature data includes: classifying the position feature data with a classifier.

For example, classifying the position feature data further includes: training the classifier with sample images to obtain a classifier parameter for eye state detection.

For example, training the classifier with sample images to obtain a classifier parameter for eye state detection includes: acquiring positive and negative sample images from a picture library, wherein the eye state in the positive sample image is the opened eye state, and the eye state in the negative sample image is the closed eye state; positioning the eye feature points in the positive and negative sample images, to obtain position coordinates of the plurality of eye feature points in the positive and negative sample images; normalizing the position coordinates of the plurality of eye feature points, to obtain normalized position feature data; and training the classifier with the position feature data to obtain a classifier parameter for detecting the eye state.

For example, positioning the plurality of eye feature points in the target image includes: detecting whether the target image includes a human face; and when detecting that the target image includes a human face, positioning the plurality of eye feature points in the image.

Figure 5:
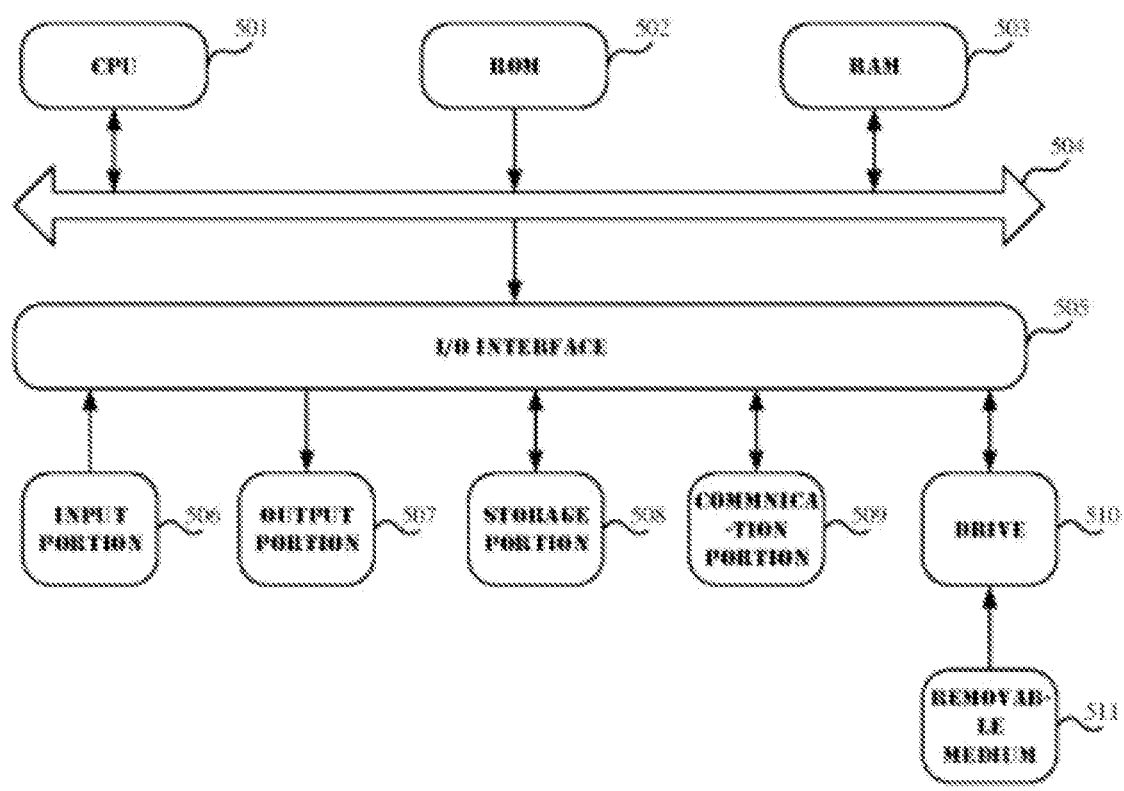
FIG. 5 is a schematic structural diagram of a computer device suitable for implementing an embodiment of the present disclosure according to an embodiment of the present disclosure.

As shown in FIG. 5, in an embodiment of the present disclosure, a schematic structural diagram of a computer device applicable for implementing the embodiment of the present disclosure is provided As shown in FIG. 5, the computer system includes a central processing unit (CPU) 501, which can perform desired actions and processes according to a program stored in a read only memory (ROM) 502 or a program loaded to a random access memory (RAM) 503 from a memory portion 508. In the RAM 503, various programs and data required for the operation of the system 500 are also stored. The CPU 501, the ROM 502, and the RAM 503 are connected to each other via a bus 504. An input/output (I/O) interface 505 is also connected to the bus 504.

The following components are connected to the I/O interface 505: an input portion 506 including a keyboard, a mouse, and the like; an output portion 507 including, for example, a cathode ray tube (CRT), a liquid crystal display (LCD), a speaker and the like; a storage portion 508 including a hard disk or the like; and a communication portion 509 including a network interface card such as a LAN card, a modem, or the like. The communication section 509 performs communication processing via a network such as the Internet. The driver 310 is also connected to an I/O interface 505 as needed. A removable medium 511 such as a magnetic disk, an optical disk, a magneto-optical disk, a semiconductor memory or the like is mounted on the drive 510 as needed so that a computer program read therefrom can be installed into the storage portion 508 as needed.

In particular, the processes described above with reference to FIGS. 1-3 can be implemented as a computer software program in accordance with embodiments of the present disclosure. For example, an embodiment of the present disclosure includes a computer program product including a computer program tangibly embodied on a machine readable medium. The computer program includes program codes for performing the methods of FIGS. 1-3. In such an embodiment, the computer program can be downloaded and installed from the network via the communication portion 509, and/or installed from the removable medium 511.

The flowchart and block diagrams in the drawings illustrate the architecture, function, and operation of possible implementations of the system, the method, and the computer program product in accordance with various embodiments of the present disclosure. In this regard, each block of the flowcharts or the block diagrams can represent a module, a program segment, or a portion of codes that includes one or more executable instructions for implementing the specified logic functions. It should also be noted that in some alternative implementations, the functions noted in the blocks can also occur in a different order than that illustrated in the drawings. For example, two successively represented blocks can be actually executed substantially in parallel, and they can sometimes be executed in the reverse order, depending upon the function involved. It is also noted that each block of the block diagrams and/or flowcharts, and combinations of blocks in the block diagrams and/or flowcharts, can be implemented in a dedicated hardware-based system that performs the specified function or operation. Alternatively, it can be implemented by a combination of dedicated hardware and computer instructions.

The sub-circuits or modules described in the embodiments of the present disclosure can be implemented by software or by hardware. The described sub-circuits or modules can also be provided in the processor. The names of these sub-circuits or modules do not in any way constitute a limitation on the sub-circuit or module itself.

In another aspect, the present disclosure further provides a computer readable storage medium, which can be a computer readable storage medium included in the apparatus described in the foregoing embodiments, or can exist separately, as a computer readable storage medium that is not assembled into the device. The computer readable storage medium stores one or more programs that are used by one or more processors to perform the eye state detection methods described in this disclosure.

The above description is only a preferred embodiment of the present disclosure and a description of the technical principles applied. It should be understood by those skilled in the art that the scope of the present disclosure referred to in the present disclosure is not limited to the specific combination of the above technical features, and should also cover other technical solutions formed by any combination of the above technical features or equivalent features thereof without departing from the inventive concept, for example, a technical solution formed by replacing the above features with but not limited to, the technical features having similar functions, as disclosed in the present disclosure.

What is claimed is:

1. An eye state detection method, comprising:
acquiring a target image;
positioning a plurality of eye feature points in the target image to determine position coordinates of the plurality of eye feature points;
normalizing the position coordinates of the plurality of eye feature points to obtain normalized position feature data; and
determining a state in the target image based on the position feature data.

2. The method according to claim 1, wherein the eye feature points comprise left eye feature points and right eye feature points; and normalizing the position coordinates of the plurality of eye feature points to obtain normalized position feature data comprises:
determining a Euclidean distance between a mean value of position coordinates of left eye feature points and a mean value of position coordinates of right eye feature points; and
normalizing the position coordinates of the plurality of eye feature points by the Euclidian distance as a standard unit, to obtain normalized position feature data.

3. The method according to claim 2, wherein determining a Euclidean distance between a mean value of position coordinates of left eye feature points and a mean value of position coordinates of right eye feature points comprises:
determining a mean value of position coordinates $$El\left(\frac{\sum_{i=1}^{0.5N} X_i}{0.5N}, \frac{\sum_{i=1}^{0.5N} Y_i}{0.5N}\right)$$

of left eye feature points and a mean value of position coordinates $$Er\left(\frac{\sum_{i=0.5N+1}^{N} X_i}{0.5N}, \frac{\sum_{i=0.5N+1}^{N} Y_i}{0.5N}\right)$$

of right eye feature points $X_i$ is the horizontal axis coordinate of the i-th eye feature point, $Y_i$ is the vertical axis coordinate of the i-th eye feature point; the value of I ranges from 1 to N, the first to the (0.5N)th eye feature points are left eye feature points, the (0.5N+1)th to the N-th eye feature points are right eye feature points, and N is an even number, and determining the Euclidean distance Ed between El and Er based on El and Er.

4. The method according to claim 3, wherein normalizing the position coordinates of the plurality of eye feature points by the Euclidean distance as a standard unit, to obtain normalized position feature data comprises: normalizing the position coordinates of the plurality of eye feature points according to the formulas $$X_{inew} = \frac{X_i - \frac{\sum_{i=1}^{N} X_i}{N}}{Ed} \text{ and } Y_{inew} = \frac{Y_i - \frac{\sum_{i=1}^{N} Y_i}{N}}{Ed},$$

to obtain new position coordinates of the plurality of eye feature points, as the normalized position feature data; where $X_{inew}$ is the new coordinate of the horizontal axis of the i-th eye feature point, and $Y_{inew}$ is the new coordinate of the vertical axis of the i-th eye feature point.

5. The method according to claim 3, wherein N=12.

6. The method according to claim 1, wherein determining an eye state in the target image based on the position feature data comprises: classifying the position feature data; and determining an eye state in the target image based on the classification result.

7. The method according to claim 6, wherein classifying the position feature data comprises: classifying the position feature data with a classifier.

8. The method according to claim 7, wherein classifying the position feature data further comprises: training the classifier with sample images to obtain a classifier parameter for eye state detection.

9. The method according to claim 8, wherein training the classifier with sample images to obtain a classifier parameter for eye state detection comprising:
  acquiring positive sample images and negative sample images from a picture library, wherein the eye state in the positive sample images is an opened eye state, and the eye state in the negative sample images is a closed eye state;
  positioning the eye feature points in the positive and negative sample images, to obtain position coordinates of the plurality of eye feature points in the positive and negative sample images;
  normalizing the position coordinates of the plurality of eye feature points, to obtain normalized position feature data;
  training the classifier with the position feature data to obtain a classifier parameter for detecting the eye state.

10. The method according to claim 1, wherein positioning a plurality of eye feature points in the target image comprises:
  detecting whether a human face is comprised in the target image; and when detecting that the target image comprises a human face, positioning the plurality of eye feature points in the target image.

11. A computer readable storage medium having stored thereon computer program instructions, when the computer program instructions are executed by a processor, the processor is caused to perform the method according to claim 1.

12. An electronic device comprising at least one processor, at least one memory, and computer program instructions stored in the memory, when the computer program instructions are executed by the processor, the processor is configured to perform:
  acquiring a target image;
  positioning a plurality of eye feature points in the target image to determine position coordinates of the plurality of eye feature points;
  normalizing the position coordinates of the plurality of eye feature points to obtain normalized position feature data; and
  determining an eye state in the target image based on the position feature data.

13. The electronic device according to claim 12, wherein the eye feature points comprise left eye feature points and right eye feature points; and
  normalizing the position coordinates of the plurality of eye feature points to obtain normalized position feature data comprises:
  determining a Euclidean distance between a mean value of position coordinates of left eye feature points and a mean value of position coordinates of right eye feature points, and
  normalizing the position coordinates of the plurality of eye feature points by the Euclidean distance as a standard unit, to obtain normalized position feature data.

14. The electronic device according to claim 13, wherein determining a Euclidean distance between a mean value of position coordinates of left eye feature points and a mean value of position coordinates of right eye feature points comprises:
  determining a mean value of position coordinates $$El\left(\frac{\sum_{i=1}^{0.5N} X_i}{0.5N}, \frac{\sum_{i=1}^{0.5N} Y_i}{0.5N}\right)$$

of left eye feature points and a mean value of position coordinates $$Er\left(\frac{\sum_{i=0.5N+1}^{N} X_i}{0.5N}, \frac{\sum_{i=0.5N+1}^{N} Y_i}{0.5N}\right)$$

of right eye feature points, where $X_i$ is the horizontal axis coordinate of the i-th eye feature point, $Y_i$ is the vertical axis coordinate of the i-th eye feature point; the value of i ranges from 1 to N, the first to the (0.5N)th eye feature points are left eye feature points, the (0.5N+1)th to the N-th eye feature points are right eye feature points, and N is an even number; and
  determining the Euclidean distance Ed between El and Er based on El and Er.

15. The electronic device according to claim 14, wherein normalizing the position coordinates of the plurality of eye feature points by the Euclidean distance as a standard unit, to obtain normalized position feature data comprises:
  normalizing the position coordinates of the plurality of eye feature points according to the formulas $$X_{inew} = \frac{X_i - \frac{\sum_{i=1}^{N} X_i}{N}}{Ed} \text{ and } Y_{inew} = \frac{Y_i - \frac{\sum_{i=1}^{N} Y_i}{N}}{Ed},$$

to obtain new position coordinates of the plurality of eye feature points, as the normalized position feature data; where $X_{inew}$ is the new coordinate of the horizontal axis of the i-th eye feature point, and $Y_{inew}$ is the new coordinate of the vertical axis of the i-th eye feature point.

16. The electronic device according to claim 12, wherein determining an eye state in the target image based on the position feature data comprises:
   classifying the position feature data; and
   determining an eye state in the target image based on the classification result.

17. The electronic device according to claim 16, wherein classifying the position feature data comprises:
   classifying the position feature data with a classifier.

18. The electronic device according to claim 17, wherein the classifying the position feature data further comprises:
   training the classifier with sample images to obtain a classifier parameter for eye state detection.

19. The electronic device according to claim 18, wherein training the classifier with sample images to obtain a classifier parameter for eye state detection comprising:
   acquiring positive sample images and negative sample images from a picture library, wherein the eye state in the positive sample images is an opened state, and the eye state in the negative sample images is a closed eye state;
   positioning the eye feature points in the positive and negative sample images, to obtain position coordinates of the plurality of eye feature points in the positive and negative sample images;
   normalizing the position coordinates of the plurality of eye feature points to obtain normalized position feature data; and
   training the classifier with the position feature data to obtain a classifier parameter for detecting the eye state.

20. An eye state detection apparatus, comprising:
   an acquiring sub-circuit configured to acquire a target image;
   a positioning sub-circuit configured to position a plurality of eye feature points in the target image to determine position coordinates of the plurality of eye feature points,
   normalization processing sub-circuit configured to normalize the position coordinates of the plurality of eye feature points to obtain the normalized position feature data; and
   a determining sub-circuit configured to determine an eye state in the target image based on the position feature data.

* * * * *